United States Patent [19]
Liles et al.

[11] Patent Number: 5,482,994
[45] Date of Patent: Jan. 9, 1996

US005482994A

[54] SILICONE/ORGANIC COPOLYMER EMULSIONS FROM PREFORMED ORGANIC EMULSIONS

[75] Inventors: Donald T. Liles; David L. Murray; Donald R. Weyenberg; Arthur J. Tselepis, all of Midland; Anthony Revis, Freeland, all of Mich.

[73] Assignee: Dow Corning Corporation, Midland, Mich.

[21] Appl. No.: 247,802

[22] Filed: May 23, 1994

[51] Int. Cl.⁶ ........................................... C08K 3/34
[52] U.S. Cl. .................. 524/789; 524/806; 525/263; 525/288; 525/342

[58] Field of Search ..................... 524/789, 806; 525/263, 288, 392

[56] References Cited

U.S. PATENT DOCUMENTS 5,214,095  5/1993  Lavoic ................................. 524/806

*Primary Examiner*—Kriellion S. Morgan
*Attorney, Agent, or Firm*—Richard I. Gearhart

[57] ABSTRACT

The polymer latices of this invention are compositions formed by adding an unsaturated alkoxy silane and an initiator to a preformed emulsion polymer. The polymer latices have utility as protective surface coatings, adhesives, sealants and as vehicles for paint formulations.

27 Claims, No Drawings

SILICONE/ORGANIC COPOLYMER EMULSIONS FROM PREFORMED ORGANIC EMULSIONS

FIELD OF THE INVENTION

This invention relates to the preparation of novel polymer latices and to the novel polymers derived therefrom. This invention also relates to novel silicone functional polymer latices which condense into stable crosslinked films upon the evaporation of essentially all of the water therefrom.

BACKGROUND OF THE INVENTION

The term "polymer latex" is well known in the art and refers to an aqueous dispersion of a water-insoluble polymer which is present in the form of very fine particles. Polymer latices are often called aqueous emulsion polymers.

Polymer latices have found wide utility as intermediates for surface coating compositions. They are often employed as adhesives and as film forming agents in paint compositions designated for all types of applications.

Those skilled in the art have attempted to prepare polymers incorporating siloxane functionality by utilizing alkoxy silanes or alkoxy silane derivatives. U.S. Pat. No. 3,294,725 describes the aqueous emulsion polymerization of organosiloxanes and silcarbanes without using strong bases or strong mineral acids as the polymerization agent and without using a separate emulsifying agent. The '725 patent describes emulsion polymerization using a combined surface active sulfonic acid catalyst such as for example dodecylbenzene sulfonic acid (DBSA). However, the '725 patent is limited to the homopolymerization of organosiloxanes and silcarbanes, and the copolymerization of various types of organosiloxanes with each other or with silcarbanes.

U.S. Pat. No. 3,449,293 discloses the emulsion polymerization of organosilanes with unsaturated monomers, and more particularly of alkoxy silanes with acrylic esters to produce solid polymers. These solid polymers are disclosed as being insoluble in common organic solvents. This insolubility indicates that the polymers are substantially crosslinked. The solid polymers are disclosed as possessing improved thermal stability as compared with non-crosslinked polymers formed from the polymerization of corresponding unsaturated monomers without siloxane incorporation. The emulsion copolymerization mechanism is described as being a simultaneous addition and condensation reaction initiated using conventional water soluble free radical initiator of the peroxide type, a redox initiator system and emulsifier.

U.S. Pat. No. 3,575,910 is also directed to the preparation of siloxane-acrylate copolymers and aqueous emulsions containing these polymer particles. The copolymers contain 25 to 90 wt. percent acrylate and 10 to 75 wt. percent of a siloxane copolymer formed from 45 to 65 mole percent of D type ($R_2SiO$) monomer and 35 to 55 mole percent of T type ($RSiO_{3/2}$) monomer. Preferably the siloxane-acrylate copolymer is formed by a two stage emulsion polymerization typically involving first forming the siloxane copolymer and secondly polymerizing the acrylate monomers in the presence of, and onto, the siloxane copolymer. An alternate method (example 13) in U.S. Pat. No. 3,575,910 is disclosed by which the acrylate and siloxane monomers are simultaneously polymerized using the stepwise addition of a free radical initiator and a buffer, but without the addition of a strong acid catalyst.

U.S. Pat. No. 3,706,697 discloses a free radical initiated aqueous emulsion polymerization of 55 to 90 percent by weight of an acrylic ester, from about 0.5 to 6 percent by weight of gamma-methacryloxypropyltrimethoxy silane (MATS) or gamma-acryloxypropyltrimethoxy silane and from about 9.5 to 44.5 weight percent of another copolymerizable free radical initiated monomer which does not have siloxane functionality.

U.S. Pat. No. 3,729,438 discloses emulsion polymers containing siloxane functionality formed from copolymers of vinyl acetate and a vinyl hydrolyzable silane, such as for example, MATS or vinyltrimethoxysilane (VTMS). The copolymers are disclosed as capable of post-crosslinking by means of the hydrolyzable siloxane functionality and the means disclosed to attempt to retard premature condensation crosslinking is through pH control of the aqueous emulsion within the range of ph 3.5 to 6.

Excessive premature crosslinking of siloxane-containing emulsion polymers was the problem addressed in Feasibility of Using Alkoxy Silane-Functional Monomers for the Development of Crosslinking Emulsions, T. R. Bourne, B. G. Bufkin, G. C. Wildman and J. R. Grave, Journal of Coatings Technology, Vol. 54, No. 684 January 1982. The authors acknowledge the inability to suppress the hydrolysis-condensation reaction of alkoxy silanes to acceptable levels despite optimizing reaction conditions to provide stable colloidal systems. In order to provide crosslinkable functionality with greater resistance to hydrolysis, the authors proposed using vinyl-type monomers with more sterically hindered alkoxy silane groups such as for example gamma-methacryloxy propylmethyldiethoxy silane (gamma-MAPMDES). However, because of the inability to prevent time dependent and implacable hydrolysis of the (alkyl-O-Si) bond in an aqueous environment, the authors concluded that the use of such sterically hindered alkoxy silane monomers, including gamma-MAPMDES, is limited mainly to applications requiring pre-crosslinked emulsion systems. The final conclusion of the paper was that if alkoxy-silane functional emulsions are to achieve the more ubiquitous status sought by industry for an advanced-generation system, then hydrolysis-resistant monomers or aqueous barrier techniques must be developed to prevent premature crosslinking of the alkoxy silane moiety.

Two references which rely on the crosslinking of siloxane moieties in emulsion copolymers are U.S. Pat. No. 3,898,300 and EPA 0153600. U.S. Pat. No. 3,898,300 discloses that the incorporation of crosslinked polyorganosiloxane particles into a styrenic copolymer matrix can improve impact strength to the polymer. EPA 0153600 discloses that emulsion polymerizing T siloxanes with film forming monomers can provide coatings with crosslinked polyorganosiloxane microparticles which can act as rheology modifiers for solvent based formulations.

U.S. Pat. No. 5,214,095 teaches copolymers prepared by a concurrent free radical and cationic initiated emulsion polymerization of at least one free radical initiatable monomer, at least one linear siloxane precursor monomer, and at least one bifunctional silane monomer having both free radical polymerizable and silicon functional groups.

However, none of the aforementioned patents describe the particular method of preparing the novel emulsion polymers of this invention.

SUMMARY OF THE INVENTION

The inventors of the present invention have discovered a novel method of grafting an unsaturated alkoxy silane onto a preformed emulsion polymer. The inventors have discovered that if an unsaturated alkoxysilane is added to a preformed organic emulsion polymer, the recruiting copolymer latex shows improvements in physical properties over copolymer latices produced by conventional methods. Moreover, the method of the present invention increases the efficiency of the silane, i.e. less silane needs to be added for the same or superior results.

The objective of the method can be achieved by adding the unsaturated alkoxy silane with an initiator to a preformed emulsion polymer.

The polymer latices of this invention are compositions formed by adding an unsaturated alkoxy silane, and an initiator to a preformed emulsion polymer, wherein the unsaturated alkoxy silane comprises 0.1 to 20% by weight of the polymer. The total solids content of the latex ranges from about 20 weight percent up to about 60 weight percent. When the water is removed from the aforesaid composition, it further condenses or cures into a clear, stable, cross-linked, polymeric film.

It is an object of this invention to teach a silicone functional polymer latex suitable for use in curable coatings, paints, caulks, adhesives, non-woven and woven fabrics, ceramic compositions and as modifiers, processing aids and additives in thermoplastics, cements and asphalts. A further object of this invention is to teach crosslinked polymers derived from said polymer latices suitable for use in these applications. Other objects and advantages of this invention will become readily apparent from the following description and appended claims.

DESCRIPTION OF THE PREFERRED EMBODIMENTS

The polymer latices of this invention are compositions formed by:
(I) providing a preformed emulsion polymer which is made from an organic monomer, a surfactant, an initiator and water, and
(II) contacting said preformed emulsion polymer with an unsaturated alkoxy silane and additional initiator.

The total solids content of the polymer latex ranges from about 20 weight percent up to about 60 weight percent. When the water is removed from the aforesaid composition, it further condenses or cures into a clear, stable, crosslinked polymic film.

The components of the preformed emulsion polymers employed in producing the polymer latices of this invention are an organic monomer, a surfactant, an initiator, water and optionally, a buffer. Methods of preparing the organic emulsion polymer of this invention are well known to those skilled in the art.

The organic monomers employed to prepare the preformed emulsion polymer of the present invention can be monomers of the formula:

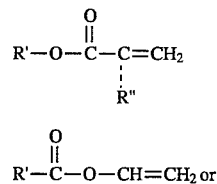

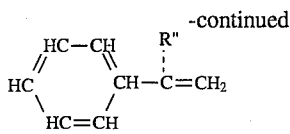

where R' is an ethyl, butyl, propyl or hexyl group; and R" is a hydrogen atom or an alkyl group having from 1–8 carbon atoms.

Illustrative examples of useful monomers are vinyl acetate, styrene, α-methyl styrene, ethyl acrylate, n-butyl acrylate, tertiary butyl acrylate, isobutyl acrylate, amyl acrylate, ethyl butyl acrylate, 2-ethylhexyl acrylate, octy lacrylate, nonyl acrylate, decyl acrylate, tridecyl acrylate, tetradecyl acrylate, hexadecyl acrylate, octadecyl acrylate, and the like. The most preferred monomers are ethyl acrylate, butyl acrylate and vinyl acetate.

Of course it is to be understood that while it is preferred to employ only organic monomers at any one time, if desired, the polymer latices can be prepared using mixtures of two or more different monomers and such types of compounds are intended to be covered by the term latex or preformed emulsion polymer used herein.

The organic monomer is polymerized in water in the presence of a surfactant. Any conventional anionic or nonionic surfactant or mixtures thereof can be used in the aqueous dispersion of this invention. Such surfactants are well know in the art and can be found more fully enumerated in "Synthetic Detergents" by J. W. McCutcheon, published by MacNair-Dorland Company, New York. Illustrative examples of such surfactants are the alkali metal salts of rosin acids, alkali metal and ammonium salts of long chain alkyl sulfates and sulfonates and the like; the alkylene oxide condensates of long chain alcohols, fatty acids, and the like. Among the more preferred surfactants are the alkoxylated condensates of alkyl phenols such as ethylene oxides of octyl and nonyl phenol, alkoxylated condensates of alcohols such as ethylene oxides of lauryl alcohol, the alkali metal alkyl sulfonates such as sodium lauryl sulfonates, and the like. In some instances it is preferred to employ both anionic and nonionic surfactants to help control particle size of the polymer. The amount of surfactant employed in the instant invention can range from about 0.25 to about 7 parts by weight or higher based on 100 parts by weight of solid polymer in the latex. A most preferred surfactant is TRITON X-200, which is an aqueous solution of an alkyaryl polyether sodium sulfonate.

The amount of water present in the system is that amount sufficient to produce a polymer latex having a polymer solids content of from about 20 weight percent up to about 60 weight percent.

An initiator is necessary to begin the emulsion polymerization, and any free radical initiator or mixtures thereof conventionally known in the art can be employed. Specific examples of such initiators are inorganic peroxides such as hydrogen peroxide, ammonium persulfate, potassium persulfate, and the like; organic peroxy catalysts such as the dialkyl peroxides, e.g. diethyl peroxide, diisopropyl peroxide, dilauryl peroxide, dioleyl peroxide, distearyl peroxide, di-(t-butyl) peroxide, di-(t-amyl) peroxide, dicumyl peroxide, and the like; the alkyl hydrogen peroxides such as t-butyl hydroperoxide, t-amyl hydroperoxide, cumene hydroperoxide, diisopropyl benzene hydroperoxide, and the like; the symmetrical diacyl peroxides, such as acetyl peroxide, propionyl peroxide, lauroyl peroxide, stearoyl peroxide, malonyl peroxide, succinoyl peroxide, phthaloyl peroxide, benzoyl peroxide and the like; ketone peroxides such as methyl ethyl ketone peroxide, cyclohexanone peroxide, and the like; the fatty oil acid peroxides, such as coconut oil acid peroxides, and the like; the unsymmetrical or mixed diacyl peroxides such as acetyl benzoyl peroxide, propionyl benzoyl peroxide, and the like; the azo compounds, such as azobisisobutyramidine hydrochloride, 2,2-azobis(isobutylronitrile), 2.2 azobis(2-methylbutyronitrile), 1,1-azobis(1-cyclohexanecarbonitrile), and the like; the disulfide; a redox type catalytic system i.e. a catalyst and a reductant, such as the sulfate-sulfites, the sulfate-sulfoxylate formaldehyde, the peroxy-sulfites, and the like, such as potassium persulfate and sodium metabisulfite, potassium persulfate and sodium or zinc sulfoxylate formaldehyde, t-butyl hydroperoxide and sodium metabisulfite, potassium persulfate and sodium thiosulfate, and the like; or mixtures of such catalysts. Obviously only a catalytic amount of the initiator need be employed. Generally amounts of initiator ranging from about 0.1 to about 1.5 parts by weight based on 100 parts by weight of solid polymer in the latex will be sufficient for most purposes. The most preferred initiator is ammonium persulfate. Redox type catalyst systems are often useful in speeding up the rate of polymerization of the monomers and/or in reducing the temperature of the polymerization process. Of course it is to be understood that the polymerization of the monomers can be carried out in a closed vessel in an inert atmosphere or under artificially induce pressure or in an open vessel under reflux at atmospheric pressure.

While not absolutely critical it is generally desirable and highly recommended that the aqueous dispersion also contain a small amount of a buffer compound for pH control of the system. Any conventional buffering agent or mixtures of such agents known in the art can be employed such as sodium acetate, sodium bicarbonate, and the like. It is generally desirable to employ that amount of buffering agent to maintain the pH of the aqueous dispersion within the range of about 3.5 to about 6. This helps to prevent hydrolysis of the hydrolyzable groups on the ingredient compounds. Generally amounts of buffer on the order of about 1.0 parts by weight or less based on 100 parts by weight of solid polymer in the latex will be sufficient for most purposes.

The preparation of the preformed emulsion polymers of this invention is well known in the art, and they can be prepared by a variety of methods. These methods are highlighted generally in the "Encyclopedia of Polymer Science and Engineering", Vol. 6, p. 1–51 (1986, John Wiley & Sons). Generally, the organic monomers are stirred into a water solution containing a surface active agent or surfactant and a water soluble free radical initiator such as ammonium persulfate. After polymerizing, the system consists of finely divided submicron particles stabilized in water.

A method of producing the preformed emulsion polymer is as follows. Water, the surfactant, such as an aqueous solution of an alkylaryl polyether sodium sulfonate (TRITON X-200, available from Union Carbide, Danbury, Conn.), an initiator (ammonium persulfate) and a buffer (sodium bicarbonate) are mixed together, and agitated for 30 minutes at room temperature under a nitrogen purge. Inhibitor-free monomer (prepared by passing the monomer through activated alumina) is added to the reaction mixture all at once. The agitation is maintained and heating is started until an exotherm occurs. The heating is then stopped. When a temperature maximum is obtained approximately 60 minutes later, heat is reapplied to the reaction mixture. After the temperature stabilizes, additional monomer is added slowly, possibly dropwise over a two hour period while the reaction temperature is maintained. The final product of this process results in the preformed emulsion polymer of the invention.

In accordance with the invention an unsaturated alkoxy silane is added to the preformed emulsion polymer along with additional initiator. The unsaturated alkoxy silanes may be of the formula $$ZR_nSiX_{3-n}$$

wherein n is an integer from 0 to 2;

z represents an allyl, vinyl, hexenyl, acryloxy or methacryloxy radical;

R is an alkyl group having 1 to 8 carbon atoms;

X is a hydrolyzable group.

The radical Z chosen for the unsaturated silane monomer is selected from the group consisting of allyl, vinyl, hexenyl, acryloxy or methacryloxy radicals.

X can be any hydrolyzable group. The term "hydrolyzable group" means any group attached to the silicon which is hydrolyzed by water at room temperature. The hydrolyzable group X includes hydrogen, halogen atoms such as F, Cl, Br or I; groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2-butoxyisobutyl, p-methoxyphenyl or —(CH$_2$CH$_2$O)$_2$CH$_3$; or any N,N-amino radical such as dimethylamino, diethylamino, ethylmethylamino, diphenylamino, or dicyclohexylamino. X Can also be any amino radical such as NH$_2$, dimethylamino, diethylamino, methylphenylamino or dicyclohexylamino; any ketoxime radical of the formula —ON=CM$_2$ or —ON=CM' in which M is any monovalent hydrocarbon or halogenated hydrocarbon radical such as those shown for Y above and M' in any divalent hydrocarbon radical both valences of which are attached to the carbon, such as hexylene, pentylene or octylene; ureido groups of the formula —N(M)CONM"$_2$ in which M is defined above hydrocarbon radical such as those shown for Z above and M" is H or any of the M radicals; carboxyl groups of the formula —OOCMM" in which M and M" are defined above or halogenated hydrocarbon radical as illustrated for Y above, or carboxylic amide radicals of the formula —NMC=O(M") in which M and M" are defined above. X can also be the sulfate group or sulfate ester groups of the formula —OSO$_2$(OM) where M is defined above hydrocarbon or halogenated hydrocarbon radical illustrated for Y; the cyano group; the isocyanate group; and the phosphate group or phosphate ester groups of the formula —OPO(OM)$_2$ in which M is defined above.

The most preferred hydrolyzable groups of the invention are alkoxy groups. Illustrative examples of the alkoxy groups are methoxy, ethoxy, propoxy, butoxy, isobutoxy, pentoxy, hexoxy, 2-ethylhexoxy, and the like; alkoxyalkoxy radicals such as methoxymethoxy, ethoxymethoxy, and the like; and alkoxyaryloxy such as ethoxyphenoxy and the like. The most preferred alkoxy groups are methoxy or ethoxy.

Such unsaturated silane monomers as well as methods for their preparation are well known in the art. Illustrative of the more preferred silanes that can be employed are for example, vinyltrimethoxysilane, vinyltriethoxysilane, vinyldimethylethoxysilane, gamma-methacryloxypropylmethyldiethoxysilane, vinylmethyldimethoxysilane, vinylmethyldiethoxysilane, vinyltris(2-methoxyethoxy)silane, gamma-methacryloxypropyltrimethoxysilane, vinyltriacetoxysilane, and the like.

An additional monomer may be added with the unsaturated alkoxy silane. The additional monomer is likely to be an additional amount of the same type of organic monomer used to prepare the preformed emulsion polymer, but could conceivably be a different organic monomer. Additional monomer is typically a low viscosity liquid that is compatible with the unsaturated alkoxy silane and contains a reactive group which can copolymerize and become part of the polymer. The additional monomer is added with the unsaturated alkoxy silane to facilitate transfer of the silane to the polymer phase of the emulsion.

In addition to the unsaturated alkoxy silane and the additional monomer, an additional initiator is added to further the copolymerization of the silane with polymer and additional monomer, if any addtional monomer is added.

The additional initiator can be any of the initiators earlier defined. Again, only a catalytic amount of the additional initiator need be employed, but generally the amounts of additional initiator added will rage from about 0.1 to about 10% by weight of he unsaturated alkoxy silane.

The particular method comprises starting with the preformed emulsion polymer, and adding the unsaturated alkoxy silane and an additional initiator thereto. The additional initiator can be the same or different from the initiator used to create the preformed emulsion.

The term "preformed emulsion polymer" is meant to emphasize that one practicing the invention begins the present method with an already prepared amount of an organic emulsion polymer. It is contemplated that the practitioner of this invention could either make the emulsion polymer of the present invention, or purchase a sufficient amount of the emulsion polymers already commercially available. The measure of preformed emulsion polymer which constitutes the starting point of this method can be prepared as described above, or by any of the large number of methods of preparing such organic emulsion polymers already known in the art.

In addition to the above-described reactants, other additives or fillers known in the art may also be added, such as amorphous silica, colloidal silica, crystalline silica, clays, aluminum silicate, mica, calcium carbonate, titanium dioxide, aluminum oxide, carbon black or zinc oxide. These fillers may be incorporated at any point in the process, but are preferrably added after the grafting reaction has been completed.

The polymer latices of this invention have a wide degree of utility in the surface coatings, paints, stains, sealants and adhesives. The instant polymer latices are particularly unique in that the polymers form crosslinked coatings merely upon drying, i.e. removal of the water from the polymer latex. The crosslinked protective polymeric films derived from said polymer latices are insoluble in toluene, water and acetone and exhibit excellent water and solvent resistance. In addition they are very durable and exhibit a very high degree of scrub resistance and are particularly useful as additives for high pigment volume concentration paint formulations. When used unpigmented the crosslinked films produce a clear, high gloss coating. Pigmented and unpigmented films may be used as primers, undercoatings or top coatings on porous or nonporous substrates, such as metal, cement, wood, wood fiber, mineral fibers, wall board, and the like, (See for example Dan Munteanu, "Moisture Crosslinkable Silane Grafted Polyolefins," ACS Organic Coatings and Appl. Polym. Sce. Proceedings, Vol. 49, 1983). In addition to paints ann architectural coatings, those skilled in the art will appreciate that the polymer latices of this invention are also useful for textile treatments, paper coatings, sealants, and adhesives.

The following examples are illustrative of the present invention and are not to be regarded as limitative.

EXAMPLE 1

In a 2 liter 3 necked flask equipped with a mechanical stirrer, a condenser, an addition funnel, a thermometer, a heating mantle (having a temperature controller) and a nitrogen purge, was added 505.8 g of deionized (DI) water, 48.6 g of a 28 percent aqueous solution of an alkyl aryl polyether sodium sulfonate (TRITON X-200), 2.5 g of ammonium persulfate. The contents of the flask were stirred for 30 minutes at room temperature while a nitrogen purge was maintained. 150 g of inhibitor-free ethyl acrylate (prepared by passing 500 g of ethyl acrylate through a bed of 100 g of 200–400 mesh activated alumina) was added to the flask all at once, stirring was maintained and heating was started. Approximately 44 minutes later, when the temperature reached 70° C., an exotherm occurred and the heating mantle was removed. When a temperature maximum was obtained (90° C.) approximately 30 minutes later, the heating mantle was reinstalled and heat was applied to the flask. After about 20 minutes, the temperature had stabilized at 70°–71° C. and an additional 300 g of the ethyl acrylate was added dropwise over a four hour period while the temperature was maintained at 70° C. After all of the monomer had been added, the emulsion was heated with stirring for 30 minutes longer at 70° C. after which the temperature was raised to 80° C. After heating for 2 hour at 80° C., the heating mantle was removed and the emulsion was allowed to cool to room temperature with stirring. The emulsion was filtered through a 149 μm mesh filter whereby 920.8 g of latex was recovered. The wet coagulum weighed 73.7 g. The emulsion had a non-volatile content of 43.6 percent by weight. The emulsion had a mean particle size of 240 nm and 99 percent of the particles were less than 369 nm, as determined by light scattering (NIACOMP). The emulsion pH was adjusted to 7 by the addition of sodium bicarbonate. This latex consisted of an emulsion of poly(ethylacrylate). A dried film of this latex produced a tacky gum that was soluble in ethyl acetate. Tensile properties of the dried film are given in Table 1.

413 g of the above described emulsion was weighed into a 1 L 3-necked flask equipped with a stirrer, a condenser, a heating mantle and a thermometer and a nitrogen purge was introduced into the flask. The stirrer was started and 0.05 g of ammonium persulfate was added to the flask followed by a solution of 2.0 g each of inhibitor-free ethyl acrylate and vinyltriethoxysilane. Heating was started and after 30 minutes the temperature reached 70° C. where it was maintained for 2 hours. 0.1 g of ammonium persulfate was added and the contents of the flask were heated with stirring at 70 C. for an additional hour. The flask was cooled to room temperature. The latex was filtered through a 149 μm mesh filter to give 403 g of recovered latex while 3 g of coagulum was collected. The emulsion had a mean particle size of 235.1 mn with 99 percent of the particles less than 488 nm, as determined by light scattering (NIACOMP). The emulsion had a nonvolatile content of 44.1 percent by weight. This composition consisted of an aqueous emulsion of poly(ethylacrylate) containing approximately 0.5 mole percent vinyltriethoxysilane. Films of this emulsion and films of this emulsion containing 10 pph 4 nm colloidal silica (NALCOAG 1115) were cast by pouring 8 g of emulsion into 100 mm diameter polystyrene Petri dishes that had been previously coated with a thin film of silicone grease. The emulsion films were allowed to dry at ambient conditions for 7 days and tensile properties were determined, see Table 1. The elastomeric films were insoluble in ethyl acetate.

Another portion of the above described 43 percent solids emulsion of poly(ethylacrylate) weighing 415 g was charged to a flask also equipped as described above. 1.75 g of vinyltriethoxysilane and 0.175 g of 2,2'-azobis(2-methylbutanenitrile), VAZO 67 was added to 15.75 g of inhibitor-free ethyl acrylate and the mixture was stirred for several minutes until a solution resulted. Stirring was started and the contents of the flask were heated to 70° C. The solution of silane, monomer and initiator was added to the flask dropwise at a rate of about 1 drop per 5 seconds. After approximately 1 hour and 15 minutes, all of the feed solution had been added and the temperature of the emulsion was increased to 80° C. Stirring and heating were maintained for 1 hour after which the emulsion was allowed to cool to room temperature. The emulsion was filtered through a 149 μm mesh filter. 429 g of emulsion was recovered and the amount of coagulum was 1.5 g. This composition consisted of an aqueous emulsion of poly(ethylacrylate) containing approximately 0.5 mole percent vinyltriethoxysilane. The emulsion had a non-volatile content of 45.92 percent by weight. The emulsion had a mean particle size of 201.5 nm with 99 percent of the particles less than 345 nm, as determined by light scattering. Films of this emulsion and films of this emulsion containing 10 pph 4 nm colloidal silica (NALCOAG 1115) were cast using the same procedure as that described in above. Films were allowed to dry at ambient conditions for 7 days and tensile properties were determined, see Table 1. The elastomeric films were insoluble in ethyl acetate.

EXAMPLE 2

An emulsion of poly(ethylacrylate) was prepared as in Example 1. To a 3 liter 3 necked flask equipped with a mechanical stirrer, a condenser, an addition funnel a thermometer, a heating mantle (having a temperature controller) and a nitrogen purge was added 758 g of deionized (DI) water, 68.1 g of a 28 percent aqueous solution of an alkyl aryl polyether sodium sulfonate (TRITON X-200), 3.75 g of ammonium persulfate and 3.3 g of sodium bicarbonate. The contents of the flask were stirred for 30 minutes at room temperature while a nitrogen purge was maintained. 225 g of inhibitor-free ethyl acrylate (EA), prepared by passing 800 g of ethyl acrylate through a bed of 150 g of 200–400 mesh activated alumina, was added to the flask all at once, stirring was maintained and heating was started. Approximately 40 minutes later an exotherm occurred, the heating mantle was removed and a temperature maximum of 88° C. was obtained. Approximately 20 minutes later, the heating mantle was reinstalled, heat was applied to the flask and an additional 450 g of inhibitor-free EA was added dropwise to the flask. EA was added to the flask over a 3 hour and 40 minute period while stirring and a 70° C. temperature were maintained. The emulsion was heated with stirring for 30 minutes longer at 70° C. after which the temperature was raised to 80° C. and heating was continued for 1 hour. The heating mantle was removed and the emulsion was allowed to cool to room temperature with stirring. The emulsion (weighing 1507.2 g) was filtered through a 149 μm mesh filter where by 4.9 g of wet coagulum was obtained and discarded. 115 g of volatiles (including some water) were removed from the latex by heating it in vacuo using a rotary evaporator. The filtered, stripped latex had a non-volatile content of 50.5 percent by weight. The emulsion had a mean particle size of 170.7 nm and 99 percent of the particles were less than 243.1 nm, as determined by light scattering (NIACOMP). This composition consisted of an aqueous emulsion of poly(ethylacrylate). A dried film of this latex produced a tacky gum that was soluble in ethyl acetate.

400 g of the above described emulsion of poly(ethylacrylate) was charged to a flask equipped similarly as that described above. 0.25 g of 2,2'-azobis(2-methylbutanenitrile), VAZO 67, was pulverized and added to the emulsion with stirring. A feed solution was made by adding 3.5 g of vinylmethyldiethoxysilane to 20 g of inhibitor-free ethyl acrylate. The emulsion containing the initiator was heated with stirring to 70° C. after which the feed solution was added dropwise over a 45 minute period. After all of the solution had been added, the emulsion was stirred at 70° C. for one hour and for an additional hour at 80° C. The emulsion was allowed to cool to room temperature with stirring. The emulsion, weighing 420.6 g, was filtered to remove coagulant (1.6 g) and heated in vacuo to remove volatiles. The final emulsion had a non volatile content of 54.8 percent by weight and a mean particle size of 490.4 nm with 99 percent of the particles less than 675 nm. This composition consisted of an aqueous emulsion of poly(ethylacrylate) containing approximately 0.5 mole percent vinylmethyldiethoxysilane.

Films of this emulsion were cast using the procedure described in Example 1. Tensile properties are given in Table 1. Swelling properties of the dried latex in ethyl acetate were determined to be 1648 volume percent swell, 78.8 percent gel.

EXAMPLE 3

An emulsion of poly(ethylacrylate) was prepared using a similar procedure as that described in Example 1. To a 3 liter 3 necked flask equipped with a mechanical stirrer, a condenser, an addition funnel a thermometer, a heating mantle (having a temperature controller) and a nitrogen purge was added 758 g of deionized (DI) water, 72.9 g of a 28 percent aqueous solution of an alkyl aryl polyether sodium sulfonate (TRITON X-200), 3.75 g of ammonium persulfate and 3.0 g of sodium bicarbonate. The contents of the flask were stirred for 30 minutes at room temperature while a nitrogen purge was maintained. 225 g of inhibitor-free ethyl acrylate (EA), prepared by passing 800 g of ethyl acrylate through a bed of 150 g of 200–400 mesh activated alumina, was added to the flask all at once, stirring was maintained and heating was started. Approximately 35 minutes later, when the temperature reached 59° C., an exotherm occurred, the heating mantle was removed and a temperature maximum of 89° C. was obtained. Approximately 20 minutes later, the heating mantle was reinstalled, heat was applied to the flask and an additional 450 g of inhibitor-free EA was added dropwise to the flask. EA was added to the flask over a 4 hour period while stirring and a 70° C. temperature were maintained. The emulsion was heated with stirring for 30 minutes longer at 70° C. after which the temperature was raised to 80° C. and heating was continued for 1 hour. The heating mantle was removed and the emulsion was allowed to cool to room temperature with stirring. The emulsion (weighing 1528.5 g) was filtered through a 149 μm mesh filter where by 3.0 g of wet coagulum was obtained and discarded. 26.4 g of volatiles (including some water) was removed from the latex by heating it in vacuo using a rotary evaporator. The filtered, stripped latex had a non-volatile content of 49.6 percent by weight. The emulsion had a mean particle size of 197.7 nm and 99 percent of the particles were less than 453.2 nm, as determined by light scattering (NIACOMP). This composition consisted of an aqueous emulsion of poly(ethylacrylate). A dried film of this latex produced a tacky gum that was soluble in ethyl acetate.

400 g of the above described emulsion of poly(ethylacrylate) was charged to a flask equipped similarly as that described above. A feed solution was made by adding 0.25 g of 2,2'-azobis(2-methylbutanenitrile), VAZO 67, to 3.63 g of vinyltriethoxysilane and shaking the mixture until a solution resulted. The emulsion was heated with stirring to 70° C. after which the feed solution was added dropwise over a 5 minute period. After all of the solution had been added, the emulsion was stirred at 70° C. for two hours and for an additional hour at 80° C. The emulsion was allowed to cool to room temperature with stirring. The emulsion, weighing 398.1 g, was filtered to remove coagulant (3.1 g) and heated in vacuo to remove volatiles (21.0 g). The final emulsion had a non volatile content of 51.2 percent by weight and a mean particle size of 194.7 nm with 99 percent of the particles less than 267.3 nm. This composition consisted of an aqueous emulsion of poly(ethylacrylate) containing approximately 0.5 mole percent vinyltriethoxysilane. Films of this emulsion were cast using the procedure described in Example 1. Tensile properties are given in Table 1.

Another 400 g portion of the above described emulsion of poly(ethylacrylate) was charged to a flask similarly equipped as described above. The contents of the flask were heated to 70° C. at which point a feed solution consisting of 2.5 g of 2,2'-azobis(2-methylbutanenitrile) (VAZO 67), 3.63 g of vinyltriethoxysilane and 20.0 g of inhibitor-free ethyl acrylate was added dropwise over a 30 minute period. Following addition of the feed solution, the emulsion was heated for an hour at 70° C. and an additional hour at 80° C. after which it was allowed to cool to room temperature. The emulsion, weighing 420.2 g, was filtered to remove coagulum (1.8 g) and heated in vacuo to remove 6.4 g of volatiles using a rotary evaporator. The emulsion had a non-volatile content of 52.1 percent by weight and a mean particle size of 199.6 nm with 99 percent of the particles less than 278.9 nm, as determined by light scattering (NIACOMP). This composition consisted of an aqueous emulsion of poly(ethylacrylate) containing approximately 0.5 mole percent vinyltriethoxysilane. Films of this emulsion were cast using the procedure described in Example 1. Tensile properties are given in Table 1.

TABLE I

Effect of Silane on Preformed Latex

| Silane | Initiatior | Add. monomer | Tensile Properties | | | |
|---|---|---|---|---|---|---|
| | | | Yield Stress (MPa) | Elong. % | 100% Modulus (MPa) | Energy to Break (mJ) |
| none | none | none | 0.138 | 2500+ | 0.055 | * |
| vinyl-Si(OEt)$_3$ | (NH$_4$)$_2$S$_2$O$_8$ | EA | 0.552 | 1243 | 0.193 | 409 |
| vinyl-Si(OEt)$_3$# | Vazo 67 | EA | 1.179 | 1220 | 0.179 | 481 |
| vinyl-Si(OEt)$_2$Me | Vazo 67 | none | 0.738 | 2007 | 0.207 | 465 |
| vinyl-Si(OEt)$_3$ | Vazo 67 | none | 0.497 | 1906 | 0.159 | 260 |
| vinyl-Si(OEt)$_3$## | Vazo 67 | EA | 1.338 | 1734 | 0.159 | 494 |

\* - did not break
\# - Example 1
\#\# - Example 3

We claim:

1. A method of forming a polymer latex, comprising the steps of:

(I) providing a preformed emulsion polymer which is made from an organic monomer, a surfactant, an initiator and water, and (II) contacting said preformed emulsion polymer with an unsaturated alkoxy silane and additional initiator.

2. The method of claim 1, where the unsaturated alkoxy silane comprises 0.1 to 20% by weight of the polymer latex.

3. The method of claim 2, where the additional initiator, comprises 0.1 to 50% by weight of the unsaturated alkoxy silane.

4. The method of claim 1 comprising the additional step of adding a filler.

5. The method of claim 1 comprising the additional step of adding colloidal silica.

6. The method of claim 1 comprising the additional step of adding a buffer.

7. The method of claim 1 comprising the additional step of heating the preformed emulsion polymer, unsaturated alkoxy silane, and additional initiator.

8. The method of claim 1, comprising the additional step of contacting the preformed emulsion polymer with additional monomer.

9. The composition made by the method of claim 1.
10. The composition made by the method of claim 2.
11. The composition made by the method of claim 3.
12. The composition made by the method of claim 4.
13. The composition made by the method of claim 5.
14. The composition made by the method of claim 6.
15. The composition made by the method of claim 7.
16. The composition made by the method of claim 8.
17. The composition made by evaporating essentially all of the water from the composition of claim 9.
18. The composition made by evaporating essentially all of the water from the composition of claim 10.
19. The composition made by evaporating essentially all of the water from the composition of claim 11.
20. The composition made by evaporating essentially all of water from the composition of claim 12.
21. The composition made by evaporating essentially all of water from the composition of claim 13.
22. The composition made by evaporating essentially all of water from the composition of claim 14.
23. The composition made by evaporating essentially all of water from the composition of claim 15.
24. The composition made by evaporating essentially all of water from the composition of claim 16.
25. A coating made from the composition of claim 9.
26. A sealant made from the composition of claim 9.
27. An adhesive made from the composition of claim 9.

* * * * *